US012151341B2

(12) United States Patent
Chiang

(10) Patent No.: US 12,151,341 B2
(45) Date of Patent: Nov. 26, 2024

(54) POWER RATCHET WRENCH HEAD

(71) Applicant: Hsu Huan Chiang, Taichung (TW)

(72) Inventor: Hsu Huan Chiang, Taichung (TW)

( * ) Notice: Subject to any disclaimer, the term of this patent is extended or adjusted under 35 U.S.C. 154(b) by 344 days.

(21) Appl. No.: 17/879,841

(22) Filed: Aug. 3, 2022

(65) Prior Publication Data

US 2024/0042582 A1 Feb. 8, 2024

(51) Int. Cl.
*B25B 21/00* (2006.01)

(52) U.S. Cl.
CPC .................................. *B25B 21/004* (2013.01)

(58) Field of Classification Search
CPC ..... B25B 21/005; B25B 21/004; B25B 21/02; B25B 13/463; B25B 13/465
See application file for complete search history.

(56) References Cited

U.S. PATENT DOCUMENTS 5,537,899 A * 7/1996 Diedrich ............... B25B 21/004 81/62
5,603,393 A * 2/1997 Ghode .................. B25B 13/461 16/DIG. 30
5,887,493 A * 3/1999 Main ....................... B25B 17/00 81/63
6,789,448 B2 * 9/2004 Ono ...................... B25B 13/465 81/57.39
8,051,746 B2 * 11/2011 Bouchard ............. B25B 21/004 81/57.39
8,261,849 B2 * 9/2012 Kobayashi ............ B25B 21/004 173/112
9,120,213 B2 * 9/2015 Elger .................... B25B 21/004
9,289,885 B2 * 3/2016 Kobayashi ............ B25B 21/005
11,766,770 B2 * 9/2023 Silha ....................... B25B 13/10 81/52
11,897,094 B2 * 2/2024 Schultz ................. B25B 13/465
2010/0326243 A1 12/2010 Bouchard et al.
2012/0186400 A1 7/2012 Elger
2014/0260834 A1 9/2014 Kobayashi
2016/0297054 A1 * 10/2016 Abunameh ............. B25B 13/08
2019/0134792 A1 5/2019 Hu
2019/0143490 A1 * 5/2019 Cheng ................... B25B 13/468 81/62
2020/0061782 A1 2/2020 Banholzer et al.
2022/0080561 A1 3/2022 Banholzer et al.

FOREIGN PATENT DOCUMENTS

| | | |
|---|---|---|
| CN | 2810892 Y | 8/2006 |
| TW | M260365 U | 4/2005 |
| TW | M377293 U | 4/2010 |
| TW | I346600 B1 | 8/2011 |
| TW | M505378 U | 7/2015 |

* cited by examiner

*Primary Examiner* — David B. Thomas
(74) *Attorney, Agent, or Firm* — Withrow + Terranova, PLLC; Vincent K. Gustafson

(57) ABSTRACT

A power ratchet wrench head has a gear set, a crank set, and a ratchet set. The crank set is connected to the gear set and has an outer casing and a crankshaft. The ratchet set is connected to the crank set and has a ratchet yoke, a transmission shaft, and a control knob. The transmission shaft engages with the ratchet yoke and has a pushing rod, an elastic element, a ratchet pawl, and two fixing pins. The pushing rod is disposed in the transmission shaft. The elastic element is disposed in the transmission shaft and abuts against the pushing rod. The ratchet pawl engages with the ratchet yoke and abuts against the pushing rod. The control knob is rotatably connected to the transmission shaft.

10 Claims, 7 Drawing Sheets

POWER RATCHET WRENCH HEAD

BACKGROUND OF THE INVENTION

1. Field of the Invention

The present invention relates to a power tool, and more particularly to a power ratchet wrench head that may provide a buffering effect and increase the service life.

2. Description of Related Art

A conventional power ratchet wrench is driven by eccentric swinging, so as to rotate the component in a forward direction or a reverse direction. The conventional power ratchet wrench has a body, a driving device, and a wrench head. The body is used for holding by a user and is connected to a power source. The driving device is connected to the body and has a cylinder and a rotor. The power source is flowed into the driving device via the body to drive the rotor to rotate relative to the cylinder. The wrench head is connected to the driving device and has a gear set, a crank set, and a ratchet set. The gear set is connected to the driving device to enhance the torque. The crank set is connected to the gear set to perform yaw rotation. The ratchet set is connected to the crank set to rotate the component in a forward direction or a reverse direction.

The torque demand of the conventional power ratchet wrench is increased day by day, and the current torque demand is about 35-55 ft. lbs. After the ratchet set is driven by the crank set, a one-piece fixing pin of the ratchet set for fixing a ratchet pawl may be broken into several segments (two to three or more segments) because the torque is transmitted in a rigid and unbuffered way. For example, when tested with a torque of 50 ft. lbs. on a conventional power ratchet wrench with a one-piece fixing pin, tightening and loosening screws each 6000 times, before it ever reached 6000 times, the one-piece fixing pin had been broken. The fixed pin that is broken into several segments cannot accurately transmit the force or cannot transmit the force at all. When the conventional power ratchet wrench is used to work on components with the broken fixing pin, it is easy to cause sliding or cannot rotate the components. Then the conventional power ratchet wrench may not work on the components, the damaged power ratchet wrench is no longer used, which relatively increases the cost of use and affects its service life. Therefore, the conventional power ratchet wrench also needs to be improved.

To overcome the shortcomings, the present invention tends to provide a power ratchet wrench head to mitigate the aforementioned problems.

SUMMARY OF THE INVENTION

The main objective of the invention is to provide a power ratchet wrench head that may provide a buffering effect and increase the service life.

A power ratchet wrench head in accordance with the present invention has a gear set, a crank set, and a ratchet set. The crank set is connected to the gear set and has an outer casing and a crankshaft. The ratchet set is connected to the crank set and has a ratchet yoke, a transmission shaft, and a control knob. The transmission shaft engages with the ratchet yoke and has a pushing rod, an elastic element, a ratchet pawl, and two fixing pins. The pushing rod is disposed in the transmission shaft. The elastic element is disposed in the transmission shaft and abuts against the pushing rod. The ratchet pawl engages with the ratchet yoke and abuts against the pushing rod. The control knob is rotatably connected to the transmission shaft.

Other objects, advantages and novel features of the invention will become more apparent from the following detailed description when taken in conjunction with the accompanying drawings.

DETAILED DESCRIPTION OF PREFERRED EMBODIMENTS

Figure 1:
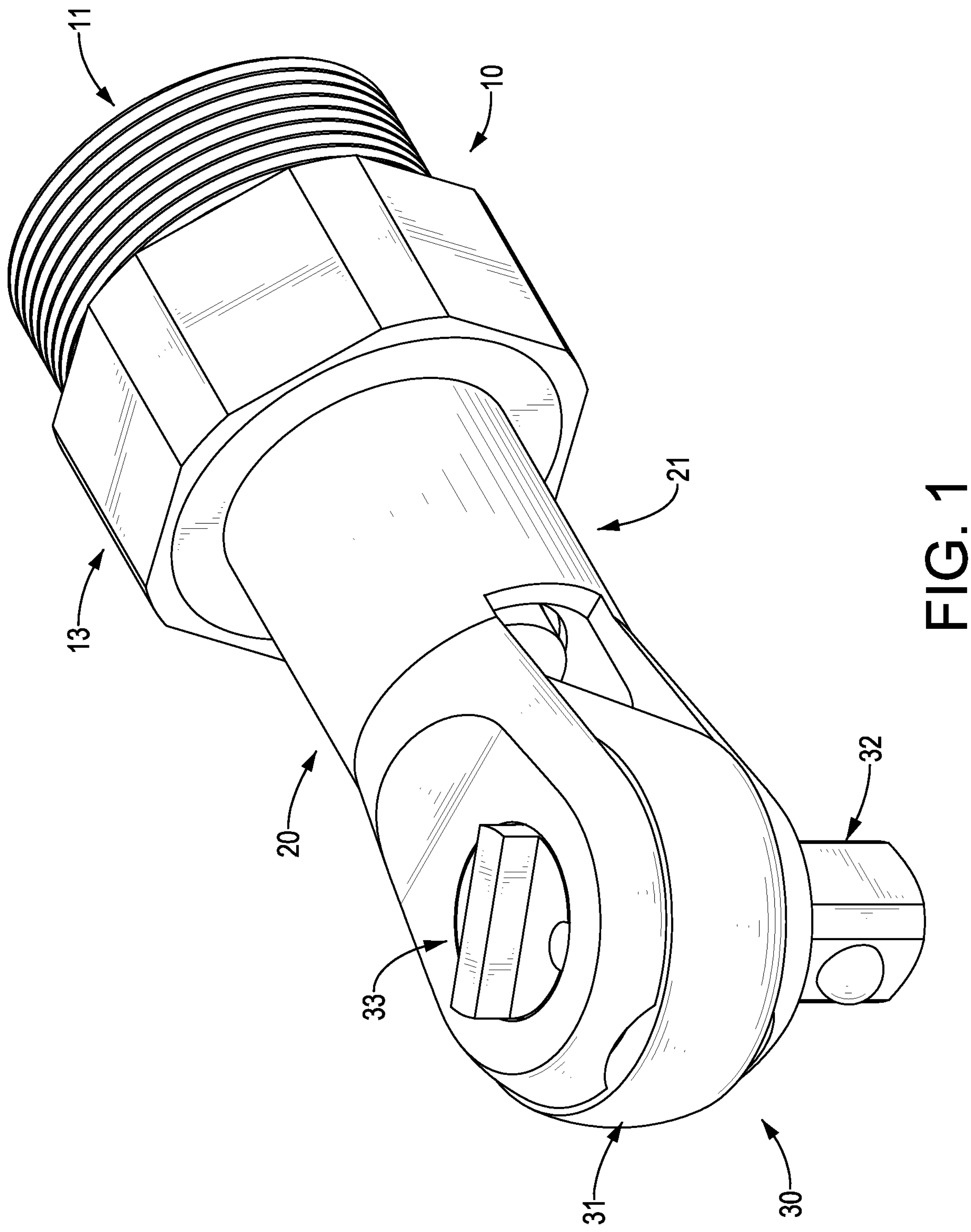
FIG. 1 is a perspective view of a first embodiment of a power ratchet wrench head in accordance with the present invention.
Figure 2:
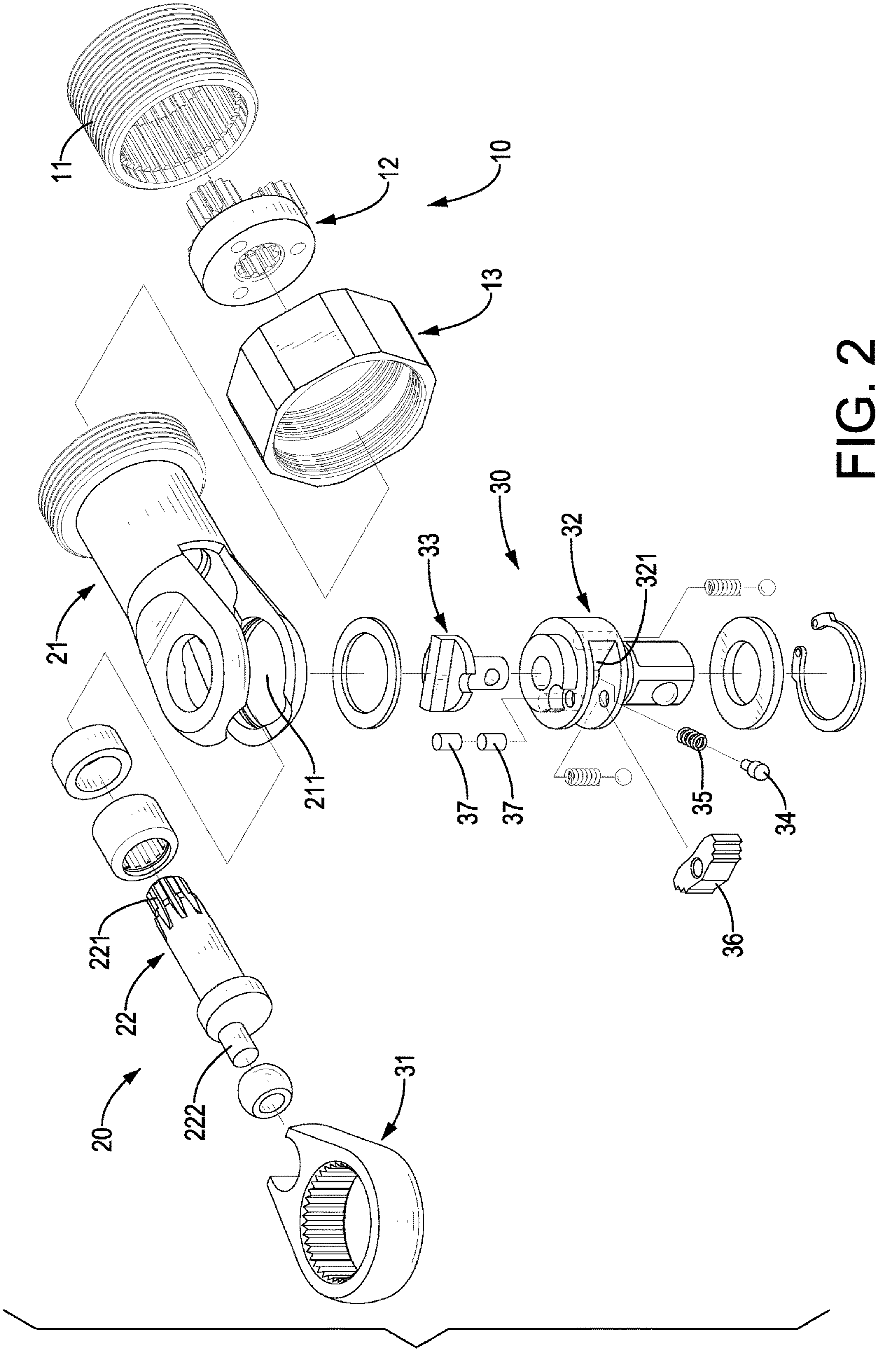
FIG. 2 is an exploded perspective view of the power ratchet wrench head in FIG. 1.

With reference to FIGS. 1 to 5, a first embodiment of a power ratchet wrench head in accordance with the present invention comprises a gear set 10, a crank set 20, and a ratchet set 30.

The gear set 10 has a gear sleeve 11, a planetary gear seat 12, and a connecting nut 13. The gear sleeve 11 has a rear end connected to a body of a power ratchet wrench. The planetary gear seat 12 is mounted in and engages with the gear sleeve 11. The connecting nut 13 is connected to a front end of the gear sleeve 11.

The crank set 20 is connected to the gear set 10 and has an outer casing 21 and a crankshaft 22. The outer casing 21 has a rear end connected to the connecting nut 13 to dispose the planetary gear seat 12 in the rear end of the outer casing 21. The outer casing has a receiving space 211 formed in a front end of the outer casing 21 and communicating with the rear end of the outer casing 21. The crankshaft 22 is disposed in the outer casing 21 and has a rear end 221 and a front end 222. The rear end 221 of the crankshaft 22 engages with the planetary gear seat 12, and the front end 222 of the crankshaft 22 extends to the receiving space 211.

The ratchet set 30 is connected to the crank set 20 and has a ratchet yoke 31, a transmission shaft 32, and a control knob 33. The ratchet yoke 31 is swingably disposed in the receiving space 211 of the outer casing 21 and abuts against the front end 222 of the crankshaft 22. The transmission shaft 32 engages with the ratchet yoke 31 via the outer casing 21 and has a chamber 321, a pushing rod 34, an elastic element 35, a ratchet pawl 36, and two fixing pins 37. The chamber 321 may be semicircular and is radially formed in a top portion of the transmission shaft 32 and communicates with an interior of the ratchet yoke 31. The pushing rod 34 is movably mounted in the chamber 321 of the transmission shaft 32 to move radially relative to the ratchet yoke 31. The elastic element 35 is mounted in the chamber 321 of the transmission shaft 32 and abuts against the pushing rod 34.

The ratchet pawl 36 engages with the ratchet yoke 31 and abuts against an end of the pushing rod 34 that is opposite to the elastic element 35. The two fixing pins 37 are connected to the top portion of the transmission shaft 32, extend into the chamber 321, and are connected to and abut the ratchet pawl 36.

Figure 5:
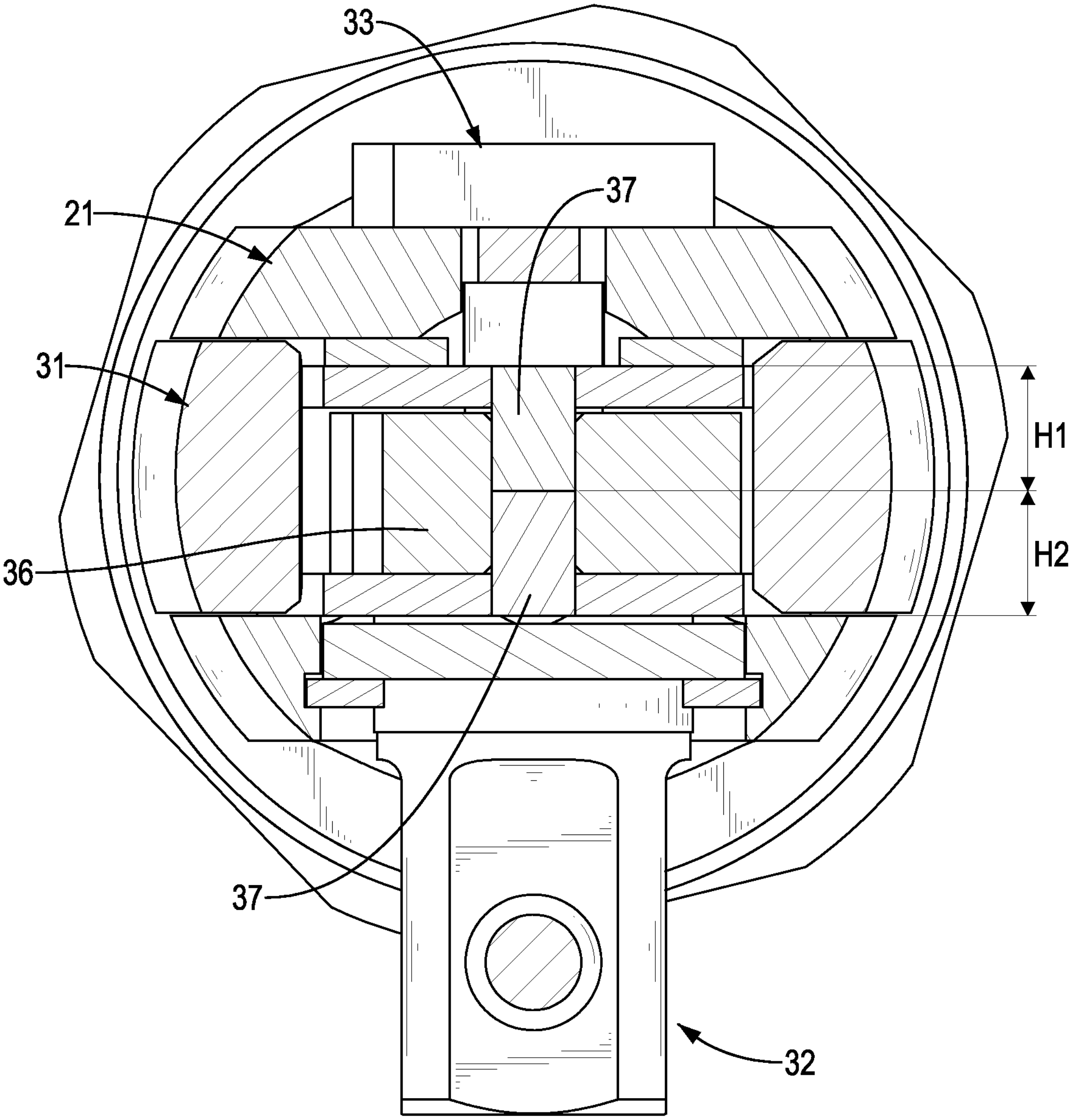
FIG. 5 is another side view in partial section of the power ratchet wrench head in FIG. 1.
Figure 6:
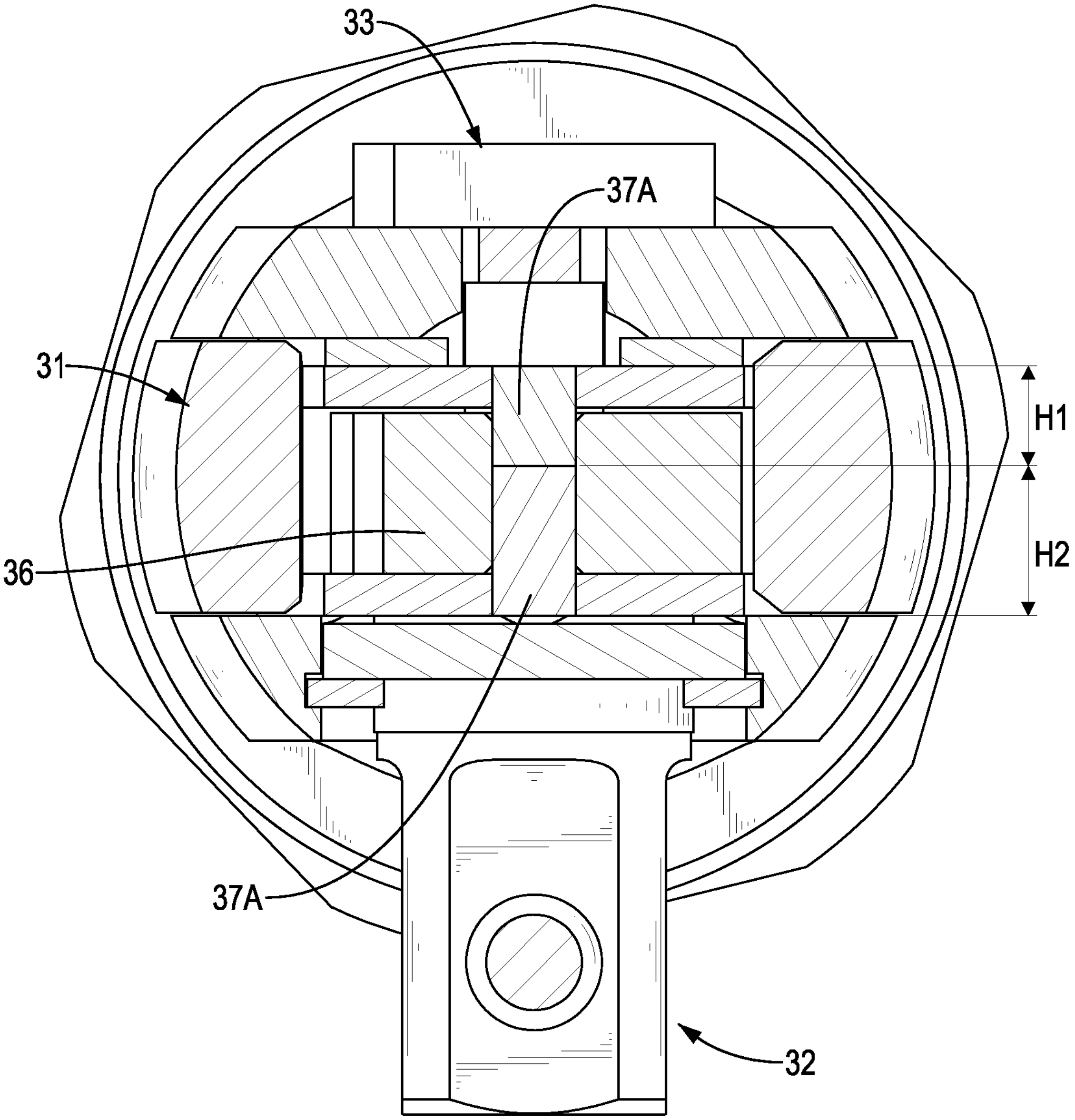
FIG. 6 is a side view in partial section of a second embodiment of a power ratchet wrench head in accordance with the present invention.
Figure 7:
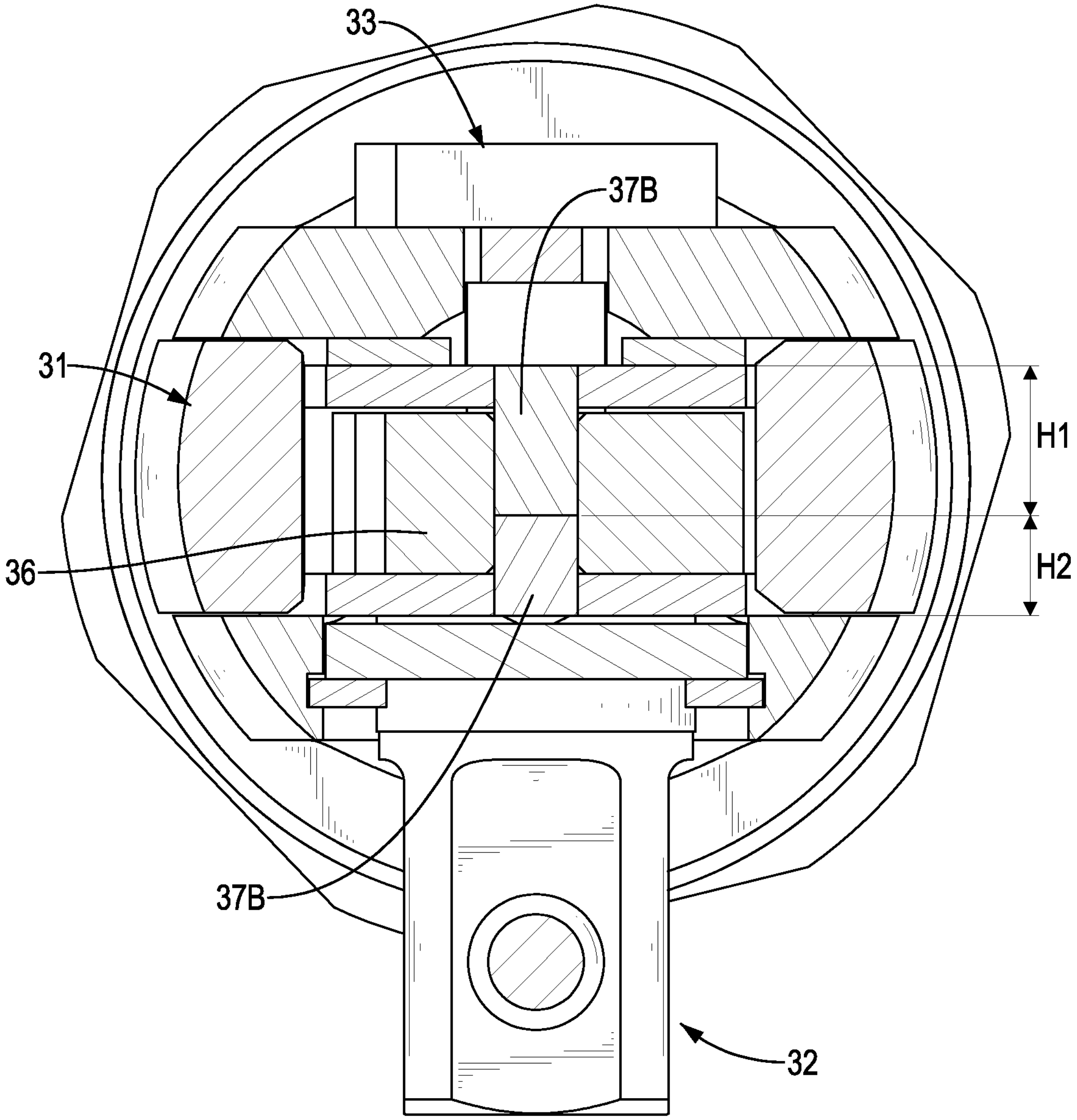
FIG. 7 is a side view in partial section of a third embodiment of a power ratchet wrench head in accordance with the present invention.

Each one of the two fixing pins 37 has a height H1, H2, and a height ratio (H1/H2) is between 0.45 and 2.0, and includes both endpoint values. With reference to FIG. 5, in the first embodiment of the present invention, the height ratio (H1/H2) is 1, and this means the heights H1, H2 of the two fixing pins 37 are the same. Furthermore, with reference to FIG. 6, in a second embodiment of the present invention, the height ratio (H1/H2) is 0.67, and this means the height H1 of the upper fixing pin 37A is shorter than the height H2 of the lower fixing pin 37A. Additionally, with reference to FIG. 7, in a third embodiment of the present invention, the height ratio (H1/H2) is 1.5, and this means the height H1 of the upper fixing pin 37B is taller than the height H2 of the lower fixing pin 37B.

In addition, the aforementioned range of the height ratio (H1/H2) of the two fixing pins 37, 37A, 37B is a result obtained after a test, under a condition of a torque value of 50 ft. lbs. A screw is tightened and loosened (each 12,000 times). After the test, the power ratchet wrench head of the present invention can accurately transmit the force within the range of the height ratio ($0.45 \leq H1/H2 \leq 2.0$), and the two fixing pins 37, 37A, 37B and related components are not abnormally worn.

The control knob 33 is rotatably connected to the transmission shaft 32, and the elastic element 35 is disposed between the control knob 33 and the ratchet pawl 36. An angle of the pushing rod 34 abutting against the ratchet pawl 36 can be adjusted via the control knob 33, so that the transmission shaft 32 rotates relative to the ratchet yoke 31 in different directions.

Figure 3:
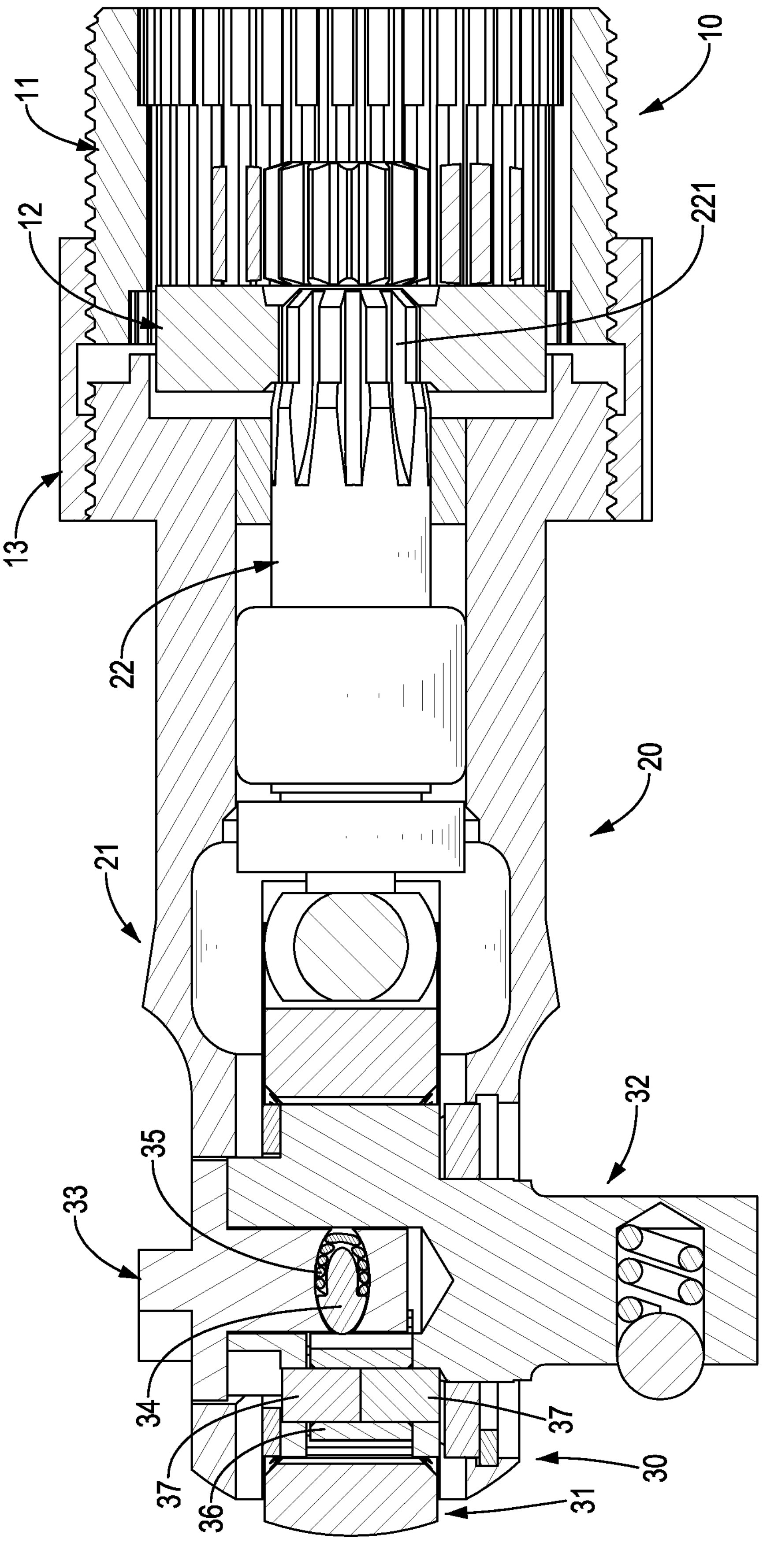
FIG. 3 is a side view in partial section of the power ratchet wrench head in FIG. 1.
Figure 4:
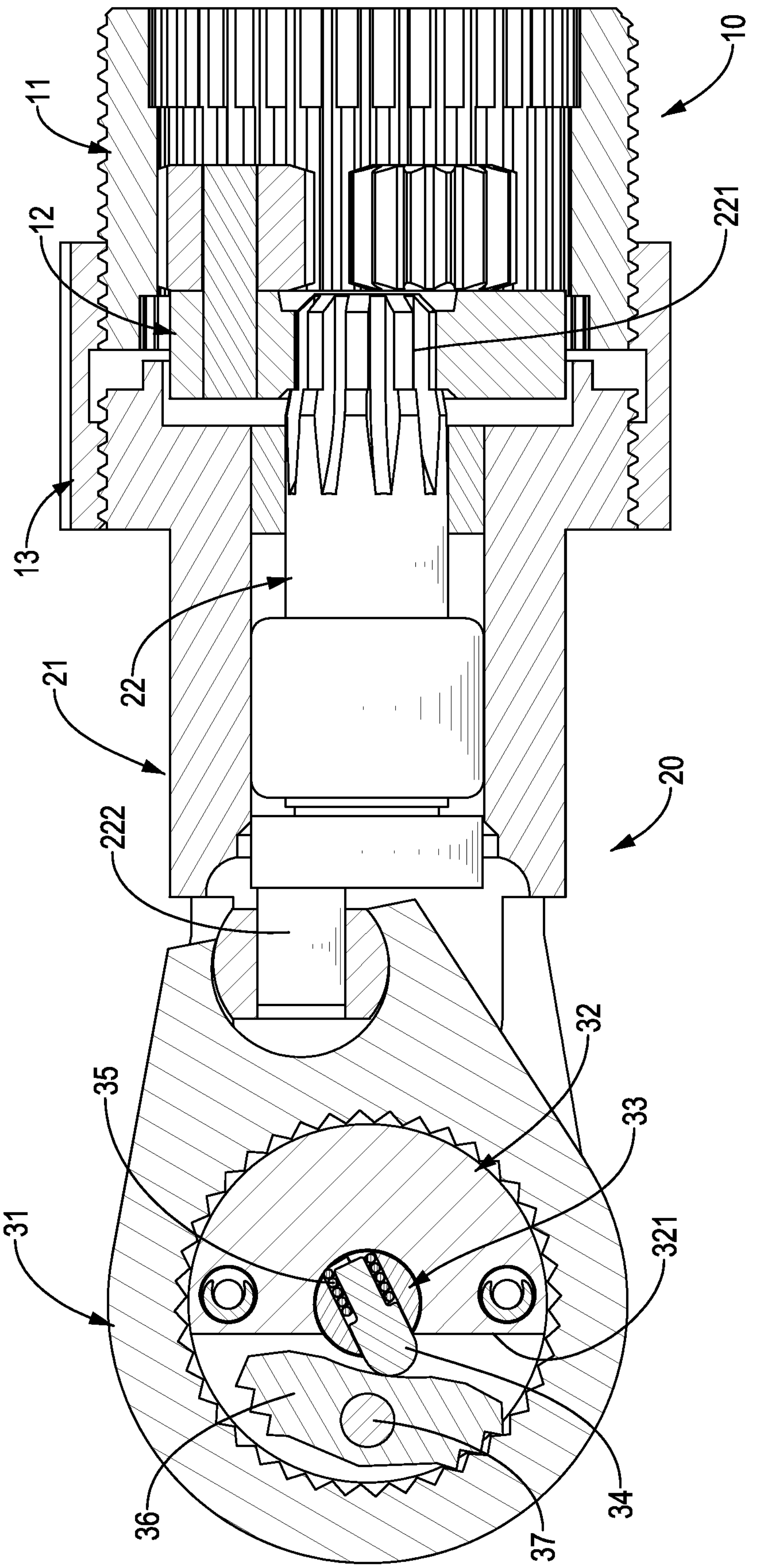
FIG. 4 is a top side view in partial section of the power ratchet wrench head in FIG. 1.

With reference to FIGS. 3 to 5, when the power ratchet wrench head of the present invention is in use, the planetary gear seat 12 is driven to rotate by a power source, the crankshaft 22 is rotated relative to the outer casing 21 via the rear end 221 of the crankshaft 32, and the ratchet yoke 31 is swung relative to the outer casing 21 via the front end 222 of the crankshaft 22 abutting against the ratchet yoke 31. Then the transmission shaft 32 is rotated relative to the outer casing 21 via the ratchet pawl 36 engaging with the ratchet yoke 31 by the pushing rod 34. When the transmission shaft 32 is driven to rotated, a component can be rotated to tighten or loosen on an object. During the rotation of the transmission shaft 32, the elastic element 35 disposed between the transmission shaft 32 and the pushing rod 34 can provide a supporting and locating effect to the ratchet pawl 36 and the ratchet yoke 31 to enable the transmission shaft 32 to rotate in a forward direction or a reverse direction. Furthermore, the elastic element 35 also can buffer the shearing force to the two fixing pins 37 during operation. Therefore, the elastic element 35 can provide dual effects of supporting and buffering. In addition, the two fixing pins 37 located between the transmission shaft 32 and the ratchet pawl 36 are not a structure of one single piece. In the process of force transmission, the two fixing pins 37 will not be broken due to the factors of rigidity and non-buffer, within the range of the height ratio (H1/H2), and can still accurately transmit the force without slipping or failing to rotate the components, so as to provide a power ratchet wrench head with buffering effect and prolonging the service life.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A power ratchet wrench head comprising:
a gear set;
a crank set connected to the gear set and having
an outer casing having
a rear end connected to the gear set; and
a front end having a receiving space communicating with the rear end of the outer casing; and
a crankshaft disposed in the outer casing and having
a rear end engaging with the gear set; and
a front end extended to the receiving space; and
a ratchet set connected to the crank set and having
a ratchet yoke swingably disposed in the receiving space of the outer casing and abutting against the front end of the crankshaft;
a transmission shaft engaging with the ratchet yoke via the outer casing and having
a chamber formed in a top portion of the transmission shaft and communicating with the ratchet yoke;
a pushing rod movably mounted in the chamber of the transmission shaft to move relative to the ratchet yoke;
an elastic element mounted in the chamber of the transmission shaft and abutting against the pushing rod;
a ratchet pawl engaging with the ratchet yoke and abutting against an end of the pushing rod that is opposite to the elastic element; and
two fixing pins connected to the top portion of the transmission shaft, extended into the chamber of the transmission shaft, and connected to and abutting the ratchet pawl; and
a control knob rotatably connected to the transmission shaft;
wherein the elastic element is disposed between the control knob and the ratchet pawl.

2. The power ratchet wrench head as claimed in claim 1, wherein each one of the two fixing pins has a height, and a height ratio of the two fixing pins is between 0.45 and 2.0 and includes both endpoint values.

3. The power ratchet wrench head as claimed in claim 2, wherein the height ratio of the two fixing pins is 0.67.

4. The power ratchet wrench head as claimed in claim 3, wherein
the gear set has
a gear sleeve having a rear end connected to a body of a power ratchet wrench;
a planetary gear seat mounted in and engaging with the gear sleeve; and
a connecting nut connected to a front end of the gear sleeve;
the rear end of the outer casing is connected to the connecting nut to dispose the planetary gear seat in the rear end of the outer casing; and
the rear end of the crankshaft engages with the planetary gear seat.

5. The power ratchet wrench head as claimed in claim 2, wherein the height ratio of the two fixing pins is 1.0.

6. The power ratchet wrench head as claimed in claim 5, wherein the gear set has a gear sleeve having a rear end connected to a body of a power ratchet wrench;

a planetary gear seat mounted in and engaging with the gear sleeve; and a connecting nut connected to a front end of the gear sleeve;

the rear end of the outer casing is connected to the connecting nut to dispose the planetary gear seat in the rear end of the outer casing; and the rear end of the crankshaft engages with the planetary gear seat.

7. The power ratchet wrench head as claimed in claim 2, wherein the height ratio of the two fixing pins is 1.5.

8. The power ratchet wrench head as claimed in claim 7, wherein the gear set has a gear sleeve having a rear end connected to a body of a power ratchet wrench;

a planetary gear seat mounted in and engaging with the gear sleeve; and a connecting nut connected to a front end of the gear sleeve;

the rear end of the outer casing is connected to the connecting nut to dispose the planetary gear seat in the rear end of the outer casing; and the rear end of the crankshaft engages with the planetary gear seat.

9. The power ratchet wrench head as claimed in claim 2, wherein the gear set has a gear sleeve having a rear end connected to a body of a power ratchet wrench;

a planetary gear seat mounted in and engaging with the gear sleeve; and a connecting nut connected to a front end of the gear sleeve;

the rear end of the outer casing is connected to the connecting nut to dispose the planetary gear seat in the rear end of the outer casing; and the rear end of the crankshaft engages with the planetary gear seat.

10. The power ratchet wrench head as claimed in claim 1, wherein the gear set has a gear sleeve having a rear end connected to a body of a power ratchet wrench;

a planetary gear seat mounted in and engaging with the gear sleeve; and a connecting nut connected to a front end of the gear sleeve;

the rear end of the outer casing is connected to the connecting nut to dispose the planetary gear seat in the rear end of the outer casing; and the rear end of the crankshaft engages with the planetary gear seat.

* * * * *